(12) United States Patent
Langlois

(10) Patent No.: US 8,333,581 B2
(45) Date of Patent: Dec. 18, 2012

(54) MOLDING UNIT ATTACHMENT SYSTEM AND MOLDING UNIT COMPRISING SUCH A SYSTEM

(75) Inventor: Jean-Christope Langlois, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 147 days.

(21) Appl. No.: 12/840,644

(22) Filed: Jul. 21, 2010

(65) Prior Publication Data
US 2011/0052743 A1   Mar. 3, 2011

(30) Foreign Application Priority Data
Jul. 23, 2009   (FR) ...................................... 09 55177

(51) Int. Cl.
*B29C 49/48*   (2006.01)
(52) U.S. Cl. ......... 425/195; 249/102; 425/182; 425/522
(58) Field of Classification Search .................. 425/182, 425/195, 522; 249/102
See application file for complete search history.

(56) References Cited

U.S. PATENT DOCUMENTS

| | | | |
|---|---|---|---|
| 4,146,600 A * | 3/1979 | Elly et al. ........................ | 264/39 |
| 5,968,560 A | 10/1999 | Briere et al. | |
| 7,381,045 B2 * | 6/2008 | Fields et al. ................... | 425/182 |
| 7,887,315 B2 * | 2/2011 | Lane ............................... | 425/195 |
| 8,038,429 B2 * | 10/2011 | Linke et al. ..................... | 425/195 |
| 2005/0013891 A1 * | 1/2005 | Hall ................................ | 425/195 |
| 2007/0212442 A1 * | 9/2007 | Nonogaki ....................... | 425/541 |
| 2009/0136613 A1 * | 5/2009 | Linke et al. .................... | 425/541 |

FOREIGN PATENT DOCUMENTS

| FR | 2 733 176 A1 | 10/1996 |
|---|---|---|
| FR | 2 902 688 A1 | 12/2007 |
| WO | 2005/042231 A1 | 5/2005 |

* cited by examiner

*Primary Examiner* — Robert B Davis
(74) *Attorney, Agent, or Firm* — Sughrue Mion, PLLC

(57) ABSTRACT

The invention relates to a molding unit attachment system enabling the attachment of at least one interchangeable molding part (11) into a seating arranged on a support (12) of a complementary shape. Said system comprises, on one of the sides of said interchangeable part (11) which is parallel to its axis, at least one fixed device (2) acting as a stop, and on the other side, a mobile locking device (3) which moves between an active locking position and an inactive locking position. The mobile locking device (3) comprises an elastic return means for automatically returning it from said inactive locking position to said active locking position, the locking device (3) being able to be manually placed in inactive position by an operator. The system is noteworthy in that it comprises on one of the sides of said interchangeable part (11) which is parallel to its axis, at least one fixed device (2) acting as a stop, the mobile locking device (3) being positioned on the other side of the interchangeable part.

17 Claims, 4 Drawing Sheets

MOLDING UNIT ATTACHMENT SYSTEM AND MOLDING UNIT COMPRISING SUCH A SYSTEM

Figure 1:
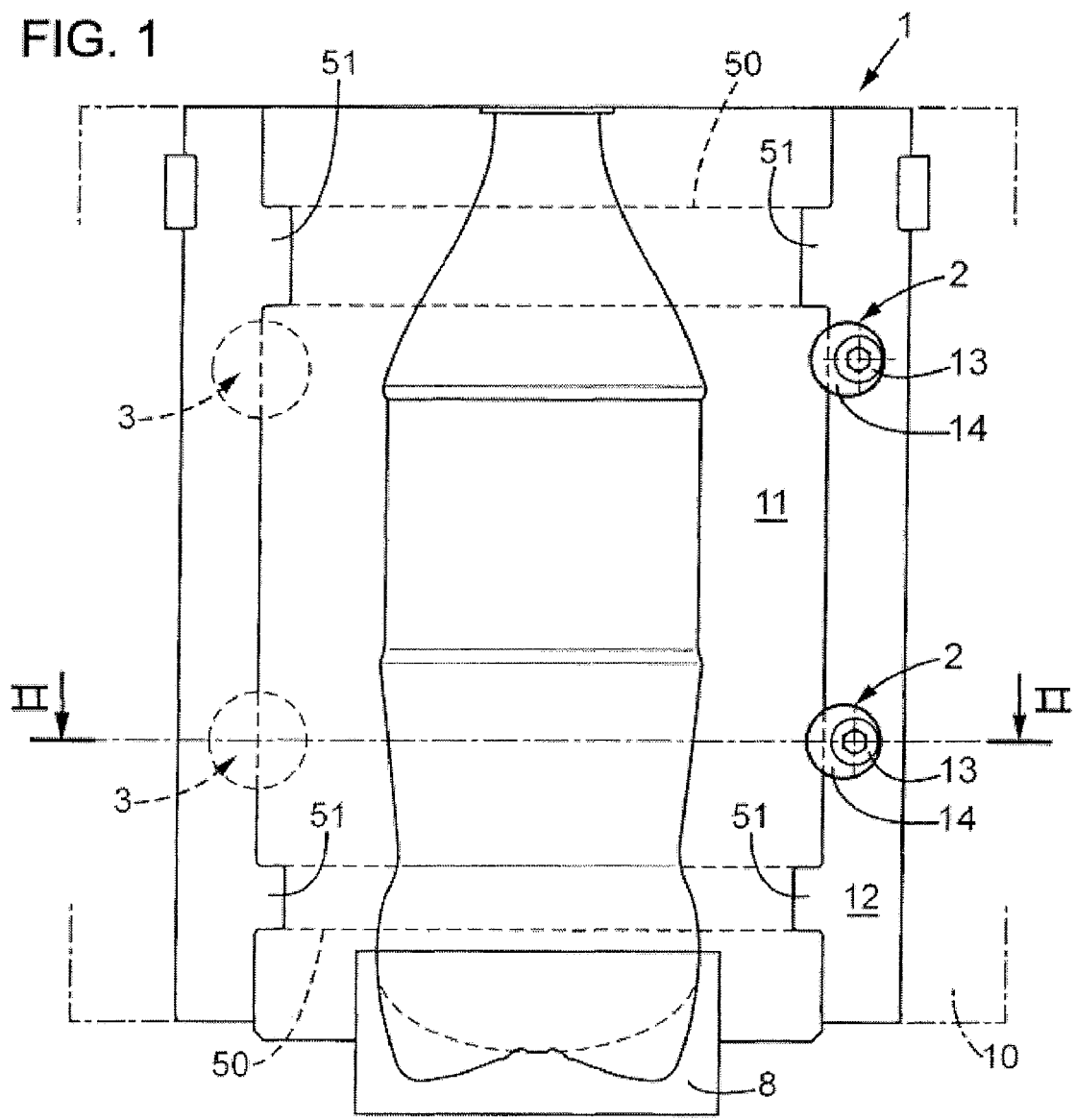

The invention relates to a molding unit attachment system enabling the attachment of at least one interchangeable molding part into a seating arranged on a support of a complementary shape, said system comprising, on one of the sides of said interchangeable part which is parallel to its axis, at least one fixed device acting as a stop, and on the other side, a mobile locking device which moves between an active locking position and an inactive locking position.

The invention also relates to a molding unit equipped with such a system.

The molding unit of the invention is intended particularly, but not exclusively, for the molding of containers of thermoplastic material, such as bottles for example, when said molding occurs by blow-molding or stretch-blow molding on an appropriate machine.

The purpose of the invention is to provide a system which in particular facilitates making changes to the appearance and/or shape of the bottles.

Document FR 2 733 176 (SIDEL) describes a molding unit which provides a means for rapid and simple changes of mold cavities.

This molding unit comprises a bracket on which is installed a structure comprising two mold carriers; each mold carrier supports a mold half which comprises:—an interchangeable part, generally called a half-shell, which bears the impression of the container to be produced, and—a support structure for the half-shell.

This support structure is fixed by appropriate means to the mold carrier and comprises a means for attaching the half-shell.

This attachment means generally consists of protruding tabs which are fixed by screws to the edge of the support structure and are set back from the mold parting line.

The tabs comprise a slot for the passage of the retaining screw and this slot allows radially displacing said tabs, within their seating, between an inactive locking position of the half shell and an active locking position. The half shell is released when the tabs are loosened and moved outwards, with no need to completely remove the screw.

However, this type of attachment requires the use of appropriate tools for loosening and tightening the screws, with all the related risks such as dropping screws, forgetting to retighten them, etc.

It was then attempted to implement other attachment means which would move between an active locking position and an inactive locking position, said means being faster to utilize, for example without requiring the use of tools to move from one position to another. In particular, it was attempted to develop means which do not require having to loosen screws to release the tab and/or which do not require a screwing operation to fix the tab in place.

A system is known from document FR 2 902 688 for attaching a mold bottom and a mold bottom support, which comprises at least one locking device that moves between an active locking position and an inactive locking position, and which comprises an elastic return means for automatically returning it from said inactive locking position to said active locking position. The locking device can be manually placed in an inactive position by an operator. Although the locking system is simpler than the one in document FR 2 733 176, it is not suitable for locking into position a part which slides relative to another part, as may be the case for example for an insert which is slid into the lateral wall of a mold before being fixed in place.

The invention concerns an attachment system of this type and which, as described in the claims, is noteworthy in that it comprises on one of the sides of said interchangeable part which is parallel to its axis, at least one fixed device acting as a stop, the mobile locking device being positioned on the other side of the interchangeable part.

When realized in this manner, the attachment system allows correct placement of the interchangeable part so it can be locked into this position. The stop in particular compensates for problems related to sliding an interchangeable part on its support.

The system of the invention can also have the following characteristics, separately or in combination:
  the locking device is fixed to said support,
  the locking device comprises a spring-and-ball system, comprising a compression spring with an end pressing against the ball, said spring constituting said elastic return means, and the interchangeable part comprises a radial seating cooperating with the ball when the interchangeable part and the support are secured together, said radial seating having a complementary shape to that of said ball,
  the locking device is a latch and catch hole system comprising a compression spring with an end pressing against the latch, said spring constituting said elastic return means, said catch hole being arranged in an edge of said interchangeable part and said latch being fixed in place in proximity to an edge of the support, said latch engaging with said catch hole in the active locking position,
  the locking device is a plate spring which is fixed to the support by one of its ends, said plate spring having a portion with a curvature that follows the shape of the seating for the support as well as a raised hump in said portion, and the interchangeable part comprises a radial seating cooperating with said hump when the interchangeable part and the support are secured together, said radial seating having a complementary shape to said hump of said plate spring.

Another object of the invention applies to any molding unit comprising two mold halves, with at least one of the two mold halves comprising:
  at least one interchangeable part having a mold cavity,
  a support comprising a seating to receive said interchangeable part,
  and a means for attaching said interchangeable part onto said support.

The invention relates to a molding unit as defined above, which is noteworthy in that the attachment means is realized by an attachment system according to the invention, as defined above.

The molding unit of the invention can have the following characteristics:
  said interchangeable part is an insert and said support is a half-shell,
  said interchangeable part is a half-shell and said support is a support structure for the half-shell,
  the molding unit comprises at least two interchangeable parts, one of the two said interchangeable parts being an insert and the other being a half-shell, said half-shell constituting said support for the insert, said molding unit also comprising a support for the half-shell realized by a half-shell support structure, said interchangeable part is semi-cylindrical and it comprises at least one peripheral groove which cooperates with at least one rail protruding from the surface of said seating of said support.

Figure 2:
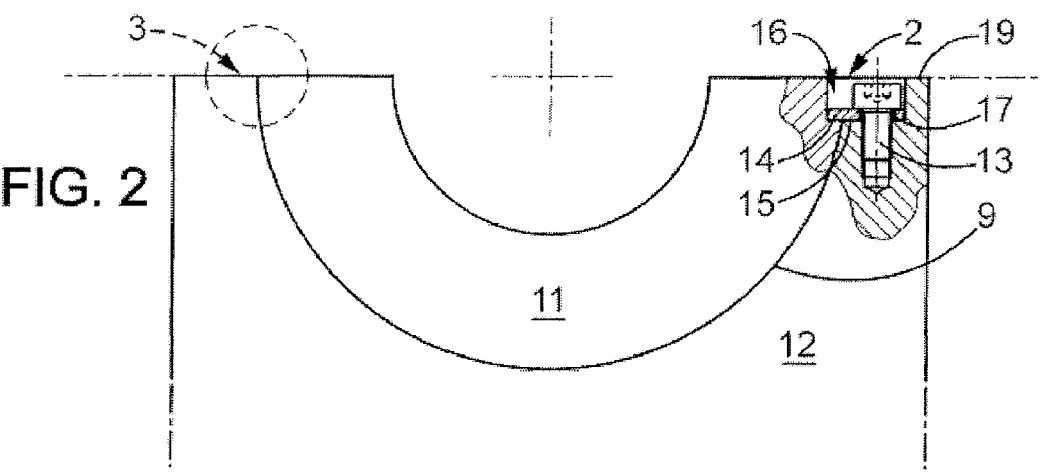
Figure 3:
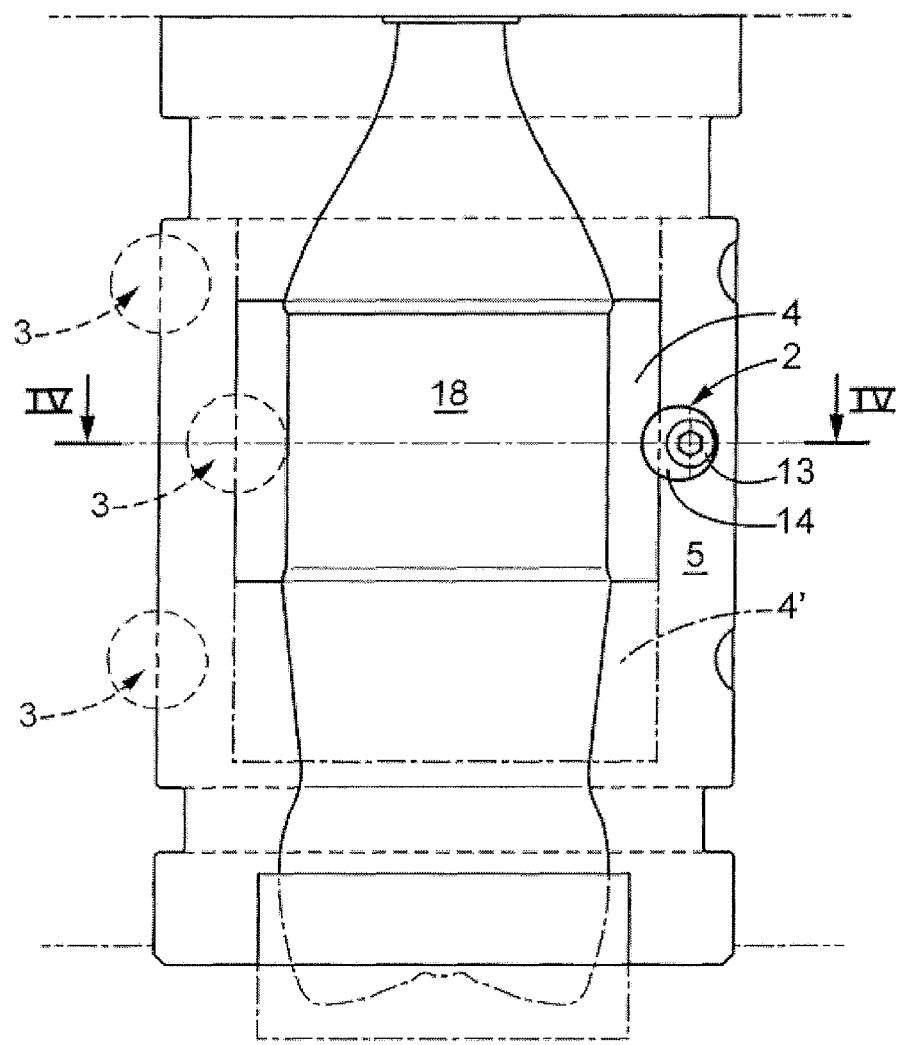
Figure 4:
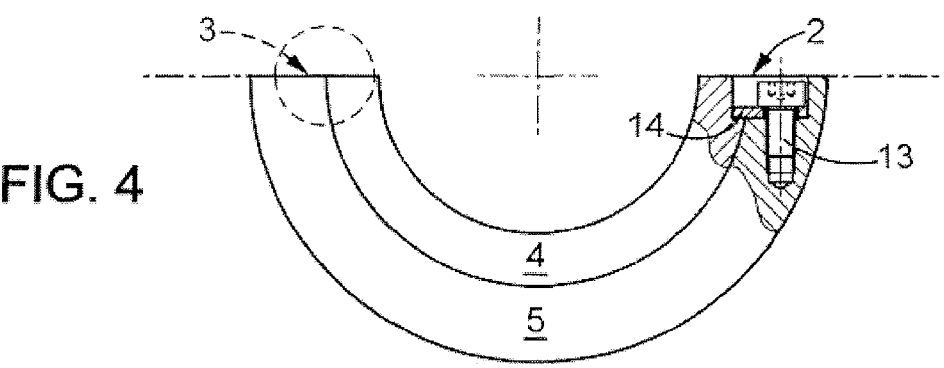
Figure 5:
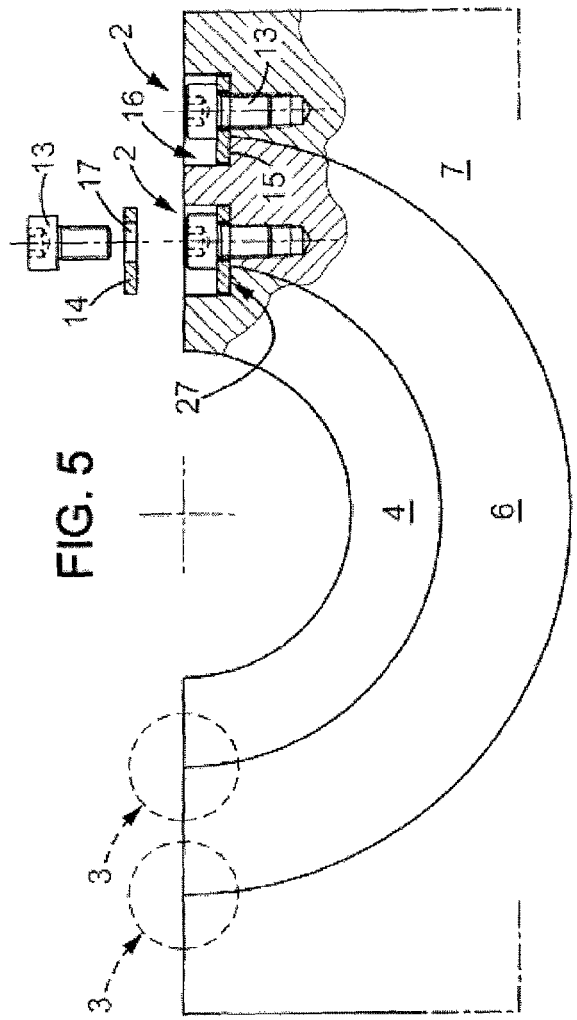
Figure 8:
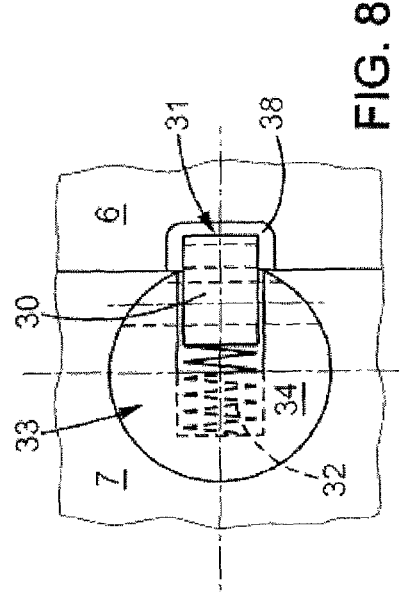
Figure 6:
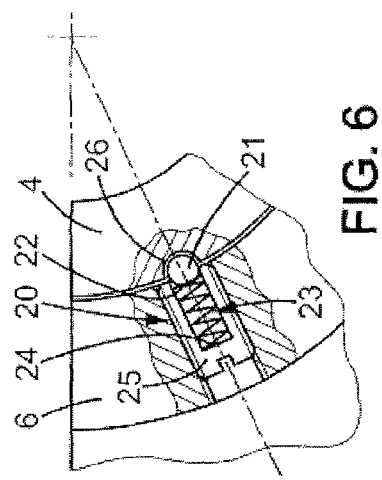
Figure 7:
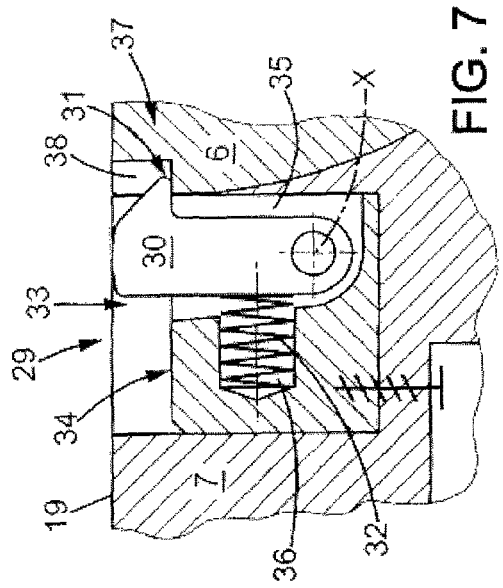
Figure 9:
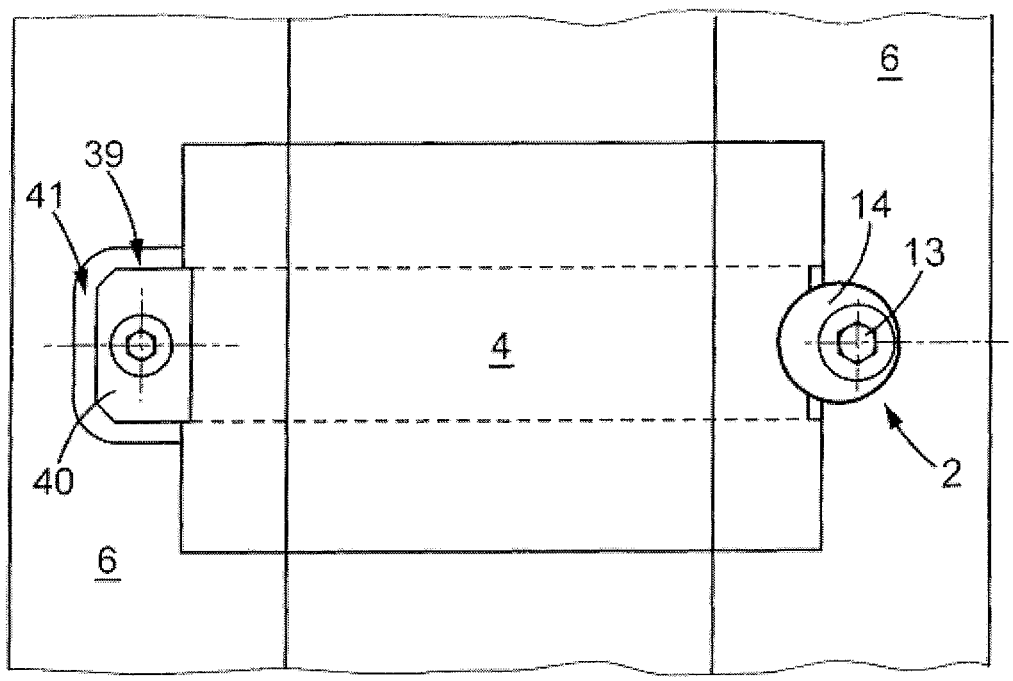
Figure 10:
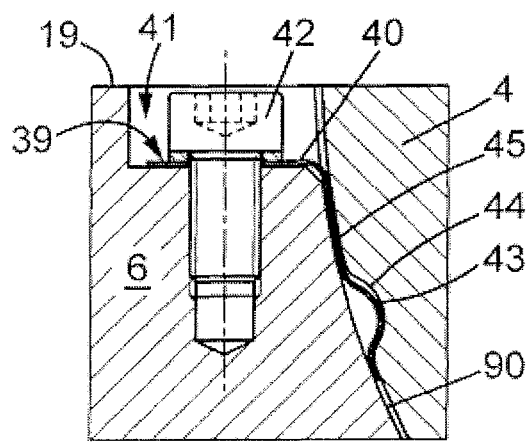
Figure 11:
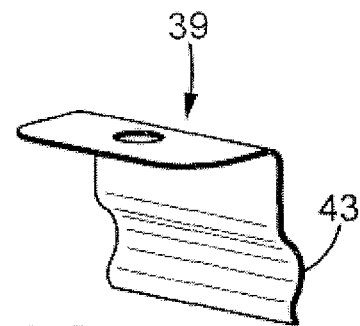

The invention will be better understood through certain embodiments which will now be presented with reference to the attached drawings, in which:

FIG. 1 shows a front view of a possible mold carrier structure with a molding unit according to the invention, comprising a half-shell fixed to a half-shell support structure that is seated in the mold carrier structure, FIG. 2 is a cross-sectional view along axis II-II of FIG. 1, FIG. 3 shows a front view of a molding unit according to one variation of the invention, comprising an insert fixed to a half-shell, FIG. 4 is a cross-sectional view along axis IV-IV of FIG. 3, FIG. 5 is a cross-sectional view of a molding unit according to another variation of the invention, FIG. 6 shows a first embodiment of a locking device in a transverse cross-sectional view of the molding unit, FIG. 7 shows a second embodiment of a locking device in a radial cross-sectional view of the molding unit, FIG. 8 is a top view of the locking device shown in FIG. 7, in the active locking position, FIG. 9 is a top view of a molding unit of the invention, comprising a locking device according to another variation of the invention, FIG. 10 is a radial cross-sectional view of the locking device shown in FIG. 9, and FIG. 11 is a perspective view of the locking device illustrated in FIGS. 9 and 10.

Only a portion of a molding unit of the invention has been represented in FIG. 1. In fact, conventionally a molding unit comprises two mold halves and a detachable mold bottom. Only one mold half 1 and a part 8 of the mold bottom have been illustrated in FIG. 1.

FIG. 1 partially shows the mold half 1 which is placed in a structure 10 called the mold carrier, said structure 10 itself being supported in the conventional manner by a bracket (not represented) of the molding unit.

The mold half 1 generally comprises a part in which a cavity in the shape of the bottle to be produced is engraved, a part that is called the half-shell 11, and another part which constitutes the support for this shell 11 and which is called the shell holder or half-shell 11 support structure 12.

In this embodiment, the cavity is a negative impression of part of a bottle to be formed.

The half-shell 11 constitutes an interchangeable part for the molding unit because it is detachably mounted onto the half-shell support structure 12, constituting a support.

The support structure 12 has a seating 9 which is arranged to receive the half-shell 11 (FIG. 2).

The half-shell 11 is semi-cylindrical in shape, and the seating 9 is of a complementary shape.

In the example shown, the half-shell 11 comprises two peripheral grooves 50 (illustrated as dotted lines in FIG. 1) and these grooves each cooperate with a rail 51, said rails projecting from the surface of the seating 9.

In this embodiment, to place the half-shell 11 on the half-shell support structure 12, the rails 51 are simply inserted into the grooves 50 and the half-shell 11 is slid along the seating 9 surface, which requires the half-shell 11 to follow a curved movement.

It should be understood that this groove and rail structure is not limiting. The invention can relate to other embodiments without grooves or rails.

For the half-shell 11 to be maintained in position in the seating 9, the molding unit 1 of the invention comprises a means for rapid attachment which will now be described.

The attachment means comprises a device 2 which is fixed relative to the support structure 12, and a locking device 3 which is a device mounted to be movable between two positions: an active locking position in which the half-shell 11 is held in place, and an inactive locking position in which the half-shell 11 is released and can be disassembled from the structure 12.

The locking device 3 is thus assembled to be retractable, to allow removing and replacing the half-shell 11 at will, but it is also designed to return automatically to the active locking position.

This means that the device 3 is a device which does not require any special action to move into the locked position.

The device 3 has not been explicitly represented in FIGS. 1 to 5 because it can be realized in different ways, as will be seen below in the description of the different embodiments shown in FIGS. 6 to 11.

It should be understood that the device 3 can be realized according to any of these embodiments, or according to another equivalent embodiment.

The fixed device 2 is substantially recessed from the parting line of the mold half, and the locking device 3 is also positioned in proximity to said parting line in a manner that effectively locks the half-shell 11 in place relative to its support constituted by the support structure 12.

As can be seen in FIGS. 1 and 2 in particular, the fixed device 2 is incorporated into the support structure 12 of the half-shell 11.

The fixed device 2 comprises a screw 13, screwed into the support structure 12, and a washer 14.

The screw 13 maintains the washer 14 in the bottom 15 of a cavity 16 arranged partially in the support structure 12 of the half-shell 11 and partially in the half-shell 11.

To achieve this, the washer 14 has a through-hole 17 which is off-center in the washer, such that as large a part as possible is pressing against the bottom 15 of the cavity 16 realized in both the support structure 12 and the half-shell 11.

The washer 14 thus acts as a stop which the edge of the half-shell 11 comes into position against when it is placed in the seating 9 of the support structure 12.

The offset of the screw 13 holding the washer 14 is visible in FIG. 1 in particular.

The depth of the cavity 16 (receiving the washer and the screw) is at least equal to the thickness of the washer plus the height of the head of the screw 13.

In this manner, when the washer 14 is fixed in place in the cavity 16, the head of the screw 13 is not protruding beyond the edge 19 of the half-shell 1, such that it does not interfere with closing the molding unit.

FIGS. 3 and 4 illustrate another embodiment of a molding unit according to the invention.

In this second embodiment, the molding unit comprises an insert 4, constituting an interchangeable part, which is detachably fixed to a half-shell 5.

In this embodiment, as illustrated in FIG. 3, several parts are engraved with the impression of the bottle; in particular, the half-shell 5 and the insert 4 associated with this half-shell 5 are so engraved.

The half-shell 5 could also be realized to receive multiple inserts without leaving the scope of the invention. A supplemental insert 4' has been represented with dotted lines in FIG. 3 for the purposes such an interpretation.

The insert 4 is represented with solid lines in the center of FIG. 3.

It is placed, for example, in the labeling area in order to form an impression 18.

The insert 4 is detachably fixed to the half-shell 5 by means of a fixed device 2, identical for example to the one described previously (according to the embodiment illustrated in FIGS. 1 and 2), and by means of a mobile locking device 3 which can be one of those shown in FIGS. 6 to 11.

FIG. 5 shows yet another embodiment of a molding unit of the invention.

The molding unit comprises an insert 4, a half-shell 6, and a support structure 7 for the half-shell 6.

The half-shell 6 is detachably mounted onto the support structure 7 by means of a fixed device 2 (as described above) and a mobile locking device 3.

The half-shell 6 constitutes a support for the insert 4, with the insert being detachably mounted onto the half-shell 6 by means of a fixed device 2 (as described above) and a mobile locking device 3.

Several embodiments of a mobile locking device 3 which can move between two positions (defined above) will now be described.

For easier comprehension, the embodiments of the locking devices 3 which will be presented are described as mounted onto the support 6 or 7 of the embodiment illustrated in FIG. 5.

Thus, depending on the embodiments presented, the locking device will be either fixed to the support 6 receiving the insert 4 or to the support 7 receiving the half-shell 6.

FIG. 6 illustrates a first embodiment of a mobile locking device 20.

This device 20 comprises a spring-and-ball system.

The spring-and-ball system comprises a ball 21 placed at one end 22 of a compression coil spring 23.

The other end 24 of the coil spring 23 presses against the bottom of a receptacle 25, said receptacle 25 being screwed or pressed into a through-hole 28 made in the half-shell 6 (or any other support: this can also be the half-shell 5 or the support structure 12).

The spring 23 has a length at rest that is substantially equal to the depth of the receptacle 25, such that the ball 21 is partially protruding from the receptacle 25.

In parallel, a hemispheric radial seating 26 is arranged in the wall of the insert 4 (or any other interchangeable part: this could also be the half-shell 11).

The radial seating 26 has a shape that is substantially complementary to that of the ball 21.

The radial seating 26 comes into a position facing the receptacle 25 of the support (half shell 6) when the insert 4 is placed in said support.

When the insert 4 is placed on the half-shell 6 constituting its support, at first the outside surface of the insert 4 presses against the ball 21 which enters into the receptacle 25 and compresses the spring 23 by exerting force against its end 22.

When the end 27 of the insert 4 comes into contact with the washer 14, the radial seating 26 is then facing the receptacle 25 comprising the spring 23 and the ball 21.

Under the action of the spring 23, the ball 21 is pushed into the radial seating 26 and locks the insert 4 in position relative to the half-shell 6.

Thus the insert 4 is fixed to the half-shell 6 manually, without the use of any special tool, and the ball 21, inserted into the radial seating 26, prevents any movement in any direction of the insert 4 relative to the half-shell 6.

A second embodiment of a mobile locking device 3 with automatic return is illustrated in FIGS. 7 and 8.

The locking device with automatic return is realized by a latch 30 and catch hole 31 system 29.

The latch 30 and the catch hole 31 are respectively arranged on the edge 19 of the support structure 7 (and therefore of the mold half 1) and on the edge 37 of the half-shell 6.

The latch 30 is mounted at one end of a compression spring 32.

This latch system 29 is seated in a bore hole 33 created at the edge 19, and is constituted of a cylindrical housing 34 which comprises a slot 35 for seating said latch 30 and a cavity 36 serving as a seating for the spring 32.

The slot 35 has a depth greater than the height of the latch 30, such that the end of the latch 30 does not protrude above the edge 19 of the mold half 1, as explained above.

The latch 30 comprises a first end which pivots around an axis X when acted upon by the spring 32, and a second end bent in the form of a hook which is able to engage with the catch hole 31 described below.

The catch hole 31 consists of a notch 38 arranged in the edge 37 of the half-shell 6, facing the slot 35 when the half shell 6 and the support structure 7 are secured together.

In this manner, the hook-shaped end of the latch 30 enters the catch hole 31 due to the action of the spring 32, when the slot 35 is next to the notch 38.

A third embodiment of a locking device 3 with automatic return is illustrated in FIGS. 9 to 11.

The locking device is realized by a plate spring 39.

The plate spring 39 has a bent end 40, fixed into a cavity 41 arranged in the edge 19 of the half-shell 6.

The end 40 is fixed thereto by a screw 42.

The depth of the cavity 42 is at least equal to the height of the head of the screw 42 plus the thickness of the plate spring 39, for the reasons explained above concerning proper closure of the molding unit 1.

Opposite the bent end 40, the plate spring has a hump 43 extending its entire width. Said hump is raised in the direction of the interior of the molding unit, towards the insert 4.

The insert 4 comprises a radial seating 44, which faces the hump 43 when the insert 4 and the half-shell 6 are secured together.

The seating 44 has a complementary shape to that of the hump 43, as can be seen in particular in FIG. 10.

Between the hump 43 and the bent end 40 of the plate spring 39, the plate spring comprises a portion 45 of a shape that matches the curve of the seating 90 that receives the insert 4, said seating 90 being arranged in the half-shell 6.

Similarly to the other embodiments, when the insert 4 is placed in the half-shell 6, such that its end presses against the washer 14, the locking device constituted by the hump 43 is engaged, meaning that it lodges in the seating 44 in a manner that holds the insert 4 in place in the half-shell 6.

It is understood from the above description that the invention allows easily fixing an interchangeable part to a support, under the action of an elastic return means and without the use of tools.

The invention therefore saves time when changing interchangeable parts. With the invention, a mold insert can be changed in a few seconds, while current systems require shutting down the machines of the facility for several minutes.

One can see from the above description how the invention improves production rates by considerably reducing the time required to change mold inserts.

In particular, it allows providing molding units which are equipped to receive multiple inserts, offering the user greater possibilities for producing bottles (or other containers) of different shapes.

It should be understood that the invention is not limited to the embodiments presented in the attached figures, and that it can extend to other variations.

For example, the attachment system could comprise two mobile locking devices arranged on each side of a mold half, without falling outside the scope of the invention.

The invention claimed is:

1. A molding unit attachment system, enabling the attachment of at least one interchangeable molding part into a seating arranged on a support of a complementary shape, said interchangeable molding part having a molding surface, said system comprising:
    at least one mobile locking device that moves between an active locking position and an inactive locking position,
    said mobile locking device comprising an elastic return means for automatically returning the mobile locking device from said inactive locking position to said active locking position,
    the mobile locking device configured to be manually placed in the inactive position by an operator, wherein the attachment system further comprises on one side of said interchangeable molding part which is parallel to a central axis of said interchangeable molding part, at least one fixed device acting as a stop, the mobile locking device being positioned on the other side of the interchangeable part; and
    wherein a portion of said mobile locking device that is configured to engage the interchangeable mold part protrudes from the support in a direction of the molding surface when in the active locking position.

2. An attachment system according to claim 1, wherein said mobile locking device is fixed to said support.

3. An attachment system according to claim 1, wherein the mobile locking device comprises a spring-and-ball system, comprising a compression spring with an end pressing against a ball, said spring constituting said elastic return means, and wherein the interchangeable part comprises a radial seating cooperating with the ball when the interchangeable molding part and the support are secured together, said radial seating having a complementary shape to that of said ball.

4. An attachment system according to claim 1, wherein the mobile locking device is a latch and catch hole system comprising a compression spring with an end pressing against the latch, said spring constituting said elastic return means, wherein said catch hole is arranged in an edge of said interchangeable molding part and said latch is fixed in place in proximity to an edge of the support, said latch engaging with said catch hole in the active locking position.

5. An attachment system according to claim 1, wherein the mobile locking device is a plate spring which is fixed to the support by one of its ends, said plate spring having a portion with a curvature that follows the shape of the seating for the support as well as a raised hump in said portion, and wherein the interchangeable molding part comprises a radial seating cooperating with said hump when the interchangeable part and the support are secured together, said radial seating having a complementary shape to said hump of said plate spring.

6. A molding unit for blow molding or stretch-blow molding at least one item, said unit comprising two mold halves and at least one of the mold halves comprising:
    at least one interchangeable molding part having a mold cavity,
    a support comprising a seating to receive said interchangeable molding part,
    and an attachment means for attaching said interchangeable part onto said support,
    wherein the attachment means is realized by an attachment system according to claim 1.

7. A molding unit according to claim 6, wherein said interchangeable molding part is an insert and wherein said support is a half-shell.

8. A molding unit according to claim 6, wherein said interchangeable molding part is a half-shell and wherein said support is a support structure for the half-shell.

9. A molding unit according to claim 6, comprising at least two interchangeable molding parts, one of the two interchangeable molding parts being an insert and the other being a half-shell, said half-shell constituting said support for the insert, said molding unit also comprising a support for the half shell realized by a half-shell support structure.

10. A molding unit according to claim 6, wherein said interchangeable molding part is semi-cylindrical and comprises at least one peripheral groove which cooperates with at least one rail protruding from the surface of said seating of said support.

11. A molding unit attachment system for attachment of an interchangeable molding part having a mold surface that is generally curved about a main axis of the interchangeable molding part, and a back surface that is also generally curved about the main axis of the interchangeable molding part, the back surface configured to engage a complementary surface of a support that is generally curved about the main axis of the interchangeable molding part when the interchangeable molding part is attached to the support, the system comprising:
    a locking mechanism comprising an engaging member moveable under an elastic force between an active locking position, in which the engaging member is extended outside from the support into an opening in the back surface when the interchangeable molding part is attached to the support portion, and an inactive position, in which the engaging member is retracted from the opening in the back surface; and
    an abutment on the support so that when the interchangeable molding part is attached to the support, the interchangeable molding part is secured in place by the abutment and the engaging member.

12. The molding unit attachment system according to claim 11, configured so that the interchangeable molding part is locked to the support with the locking mechanism by rotating the interchangeable molding part about the main axis until interchangeable molding part engages the abutment.

13. The molding unit attachment system according to claim 11, wherein the engaging member is configured to be retracted to unlock the interchangeable molding part by direct manual contact of the engaging member or by rotating the interchangeable molding part about the main axis.

14. The molding unit attachment system according to claim 11, wherein the engaging member is a ball under the elastic force of a spring, and wherein the back surface has an opening configured to receive the ball to thereby lock the interchangeable molding part to the support.

15. The molding unit attachment system according to claim 11, wherein the engaging member is a rounded protrusion extending from a surface of an elastic plate, and wherein the back surface has an opening configured to receive the rounded protrusion to thereby lock the interchangeable molding part to the support.

16. The molding unit attachment system according to claim 11, wherein the engaging member is a latch under the elastic force of a spring, and wherein the back surface has an opening configured to receive the latch to thereby lock the interchangeable molding part to the support.

17. The molding unit attachment system according to claim 16, wherein the latch is manually accessible so as to be retracted.

* * * * *